(12) United States Patent
Kil

(10) Patent No.: US 8,502,950 B2
(45) Date of Patent: Aug. 6, 2013

(54) SUBSTRATE FOR GATE-IN-PANEL (GIP) TYPE LIQUID CRYSTAL DISPLAY DEVICE AND METHOD FOR MANUFACTURING THE SAME

(75) Inventor: Wang Seob Kil, Daejeon-si (KR)

(73) Assignee: LG Display Co., Ltd., Seoul (KR)

( * ) Notice: Subject to any disclaimer, the term of this patent is extended or adjusted under 35 U.S.C. 154(b) by 1142 days.

(21) Appl. No.: 11/639,992

(22) Filed: Dec. 15, 2006

(65) Prior Publication Data

US 2008/0002130 A1    Jan. 3, 2008

(30) Foreign Application Priority Data

Jun. 29, 2006   (KR) .......................... 10-2006-059129

(51) Int. Cl.
*G02F 1/1345* (2006.01)
(52) U.S. Cl.
USPC .......................................................... 349/149
(58) Field of Classification Search
USPC .......................................................... 349/149
See application file for complete search history.

(56) References Cited

U.S. PATENT DOCUMENTS

| | | | | |
|---|---|---|---|---|
| 6,825,911 | B2 * | 11/2004 | Lee et al. ...................... | 349/192 |
| 7,209,208 | B2 * | 4/2007 | Iwabuchi ....................... | 349/149 |
| 2004/0125307 | A1 * | 7/2004 | Lee et al. ...................... | 349/149 |
| 2009/0219457 | A1 * | 9/2009 | Seo et al. ....................... | 349/55 |

FOREIGN PATENT DOCUMENTS

| | | |
|---|---|---|
| KR | 100479525 B1 | 3/2005 |
| KR | 10-2005-0068290 | 7/2005 |

OTHER PUBLICATIONS

Search Report dated Mar. 6, 2007 for corresponding United Kingdom Patent Application No. GB0623870.3.
Office Action issued in corresponding Korean Patent Application No. 10-2006-0059129, mailed Sep. 21, 2012.

* cited by examiner

*Primary Examiner* — Timothy L Rude
(74) *Attorney, Agent, or Firm* — Brinks Hofer Gilson & Lione

(57) ABSTRACT

A substrate for a GIP type liquid crystal display device comprising MPS wires for inspecting lines after a cell array process is disclosed herein. The substrate comprises a mother substrate comprising a plurality of panel regions defined therein, each of the panel regions including an active area having a thin film transistor array formed therein, a dummy area and a non-display area, a plurality of TCPs disposed in the non-display area of the mother substrate; a GIP gate driver and signal lines to apply various signals to the GIP gate drivers, the GIP gate driver and signal lines being disposed in the dummy area; and a plurality of MPS wires extending from the non-display area of a first panel region to a non-display area opposite to a data pad of an adjacent panel region to inspect for defects of gate lines, data lines, common line, voltage line and the signal lines.

10 Claims, 8 Drawing Sheets

SUBSTRATE FOR GATE-IN-PANEL (GIP) TYPE LIQUID CRYSTAL DISPLAY DEVICE AND METHOD FOR MANUFACTURING THE SAME

This application claims the benefit of Korean Patent Application No. 10-2006-59129 filed on Jun. 29, 2006, which is hereby incorporated by reference as if fully set forth herein.

TECHNICAL FIELD

The present invention relates to a gate-in-panel (GIP) type liquid crystal display device, and more particularly, to a substrate for a GIP type liquid crystal display device, which comprises mass product system (MPS) wires for inspecting respective lines after a cell array process, and a method for manufacturing the GIP type liquid crystal display device.

BACKGROUND

Conventional liquid crystal display devices display images through changes in light transmittance caused by the behavior of liquid crystals having dielectric anisotropy in an applied electric field. For this purpose, the liquid crystal display device is provided with a liquid crystal display panel, in which pixel regions are arranged in a matrix form, and a drive circuit to drive the liquid crystal display panel.

The liquid crystal display panel comprises first and second substrates joined to each other with a predetermined space therebetween, and a liquid crystal layer disposed between the first and second substrates. To drive the liquid crystal layer for each pixel, the first substrate includes a plurality of gate lines and a plurality of data lines orthogonally crossing each other to define the pixel regions. Each pixel region has a pixel electrode formed therein, and a thin film transistor formed near to the crossing of each gate line and data line. The thin film transistor turns on in response to scanning signals from the gate line and applies data signals from the data line to the pixel electrode.

The second substrate includes a black matrix layer to shield light at a portion that does not include the pixel regions, and color filter layers formed in the respective pixel regions to generate colors. The second substrate may also include a common electrode opposite to the pixel electrodes to generate electric fields to drive the liquid crystal layer.

The drive circuit comprises a gate driver to drive the gate lines, a data driver to drive the data lines, and a timing controller to supply control signals and data signals to control the gate driver and data driver.

The gate driver is provided with a shift register to sequentially output scan pulses to the respective gate lines. The shift register is composed of a plurality of stages dependently connected with each other. The plural stages serve to sequentially output the scan pulses and then sequentially scan the gate lines of the liquid crystal panel.

Specifically, a first stage among the plural stages receives a start signal from the timing controller as a trigger signal, and the remaining stages receive output signals from their prior stages as the trigger signal. In addition, each of the plural stages is applied with at least one of plural clock pulses having sequential phase differences. Accordingly, the scan pulses can be sequentially outputted from the first stage to the last stage.

In such a conventional gate driver, a separate gate driver integrated circuit (IC) having the shift register of the gate driver embedded therein is formed and connected to a gate line pad of the liquid crystal display panel through a mounting process and the like.

FIG. 1 is a partially exploded perspective view of a conventional liquid crystal display device.

Referring to FIG. 1, the conventional liquid crystal display device comprises first and second substrates 1 and 2 bonded to each other with a predetermined space therebetween, and a liquid crystal layer 3 formed between the first and second substrates 1 and 2.

More specifically, the first substrate 1 has a plurality of gate lines 4 arranged at constant intervals in one direction, and a plurality of data lines 5 arranged at constant intervals in another direction perpendicular to the gate lines to define pixel regions P therebetween. Each of the pixel regions P defined by the gate lines 4 and data lines 5 includes a pixel electrode 6 and a thin film transistor T disposed near a crossing point of the gate line 4 and the data line 5. The thin film transistor T is turned on or off in response to a scanning signal from the gate line 4 and applies a data signal from the data line 5 to the pixel electrode 6. This substrate is called a thin film transistor array substrate.

The second substrate 2 is provided with a black matrix layer 7 to shield light from passing through a portion excluding the pixel regions P. The second substrate 2 also includes RGB color filter layers 8 to exhibit colors and a common electrode 9 to realize an image. This substrate is called a color filter array substrate.

Generally, a method for manufacturing a liquid crystal display device can be divided into a cell array process, an assembly process, and a module process.

The cell array process includes a thin film transistor array process and a color filter array process. The thin film transistor array process includes steps of defining a plurality of first panel regions on a first mother substrate, and forming a thin film transistor array including gate lines, data lines, thin film transistors and pixel electrodes in the respective panel regions. The color filter array process includes steps of defining a plurality of second panel regions on a second mother substrate, and forming a color filter array comprising a black matrix layer, RGB color filter layers and a common electrode in the respective second panel regions.

The assembly process includes steps of forming a sealant at an edge of each panel region of the first or second mother substrate, depositing liquid crystals in each panel region of the first or second mother substrate, and aligning and bonding the first and second mother substrates to each other. Additionally, the assembly process comprises cutting the bonded first and second mother substrates into unit panel regions, and inspecting the respective unit panel regions by auto-probe inspection.

The module process is a process to attach a drive IC to each of the unit panels, followed by assembling a backlight unit thereto.

When the cell array process is completed, defects due to opens or shorts of the respective signal lines of the thin film transistor array are checked (that is, a mass product system inspection, which will be hereinafter referred to as an "MPS inspection," is carried out) before the assembly process, to determine if the product is defective, and a repair process is additionally performed if it is determined that a certain product has a defect.

For the MPS inspection, MPS wires for the inspection are formed during the cell array process and then removed by the cutting process.

FIG. 2 is a plan view illustrating the MPS wires of the conventional liquid crystal display device.

Plural panel regions are defined on a mother substrate 20. Here, each of the panel regions has a display area 21 and a non-display area 22 defined therein. In FIG. 2, two panel regions are shown.

The display area of each panel region on the mother substrate 20 is formed with the thin film transistor array (not shown) as shown in FIG. 1, and the non-display area of each panel region is formed with MPS wires 23 and MPS pads 24.

The MPS wires 23 typically comprise about 5 to 6 wires, such as a wire "G/E" for inspecting gate lines of even order, a wire "G/O" for inspecting gate lines of odd order, a wire "D/E" for inspecting data lines of even order, a wire "D/O" for inspecting data lines of odd order, a wire "Vcom" for inspecting a common line, a wire "GND" for inspecting a ground line, a wire "VDD" for inspecting a voltage line, etc. The MPS wires 23 are formed on a gate pad region or a data pad region of the non-display area.

In addition, the MPS wires 23 and MPS pads 24 are formed simultaneously when forming the gate lines of the thin film transistor array. The MPS wires 23 are connected to corresponding gate, data, common, ground, voltage, and signal lines via the same material as that used for the pixel electrodes.

Recently, however, a gate-in-panel (GIP) technique is used, in which a shift register is directly formed on the liquid crystal display panel without forming a separate gate driver IC, to reduce material costs, the number of processes, and a process time. In other words, the shift register of the gate driver is formed in the liquid crystal display panel.

There will be described hereinafter a conventional GIP type liquid crystal display device.

FIG. 3 is a plan view of the conventional GIP type liquid crystal display device.

Referring to FIG. 3, for the GIP type liquid crystal display device, a lower substrate 31 is bonded to an upper substrate 32 via a sealant 40 with a predetermined space therebetween. Here, the lower substrate 31 has a larger size than that of the upper substrate 32 to form a non-display area on which a data driver and the like are mounted, and display areas within the region generally bounded by the sealant 40 on the bonded upper and lower substrates 31 and 32. In FIG. 3, the non-display area of the lower substrate 31 is mounted with a tape carrier package (TCP) 37.

In addition, each display area of the bonded upper and lower substrates 31 and 32 is divided into an active area (A/A) and a dummy area (D).

As described above, although not shown in the drawings, the active area (A/A) in the display area of the lower substrate 31 includes the gate lines, data lines, pixel electrodes, and the thin film transistors, and the active area (A/A) in the display area of the upper substrate 32 is formed with the black matrix layer, color filter layers and the common electrode (see FIG. 1).

The dummy area (D) in the display area of the lower substrate 31 is formed with a common line (not shown in the drawings), a GIP gate driver 33, a GIP dummy gate driver 34, and signal lines 35 to apply various signals (clock signal, enable signal, start signal, common voltage, etc.) output from the timing controller to the GIP gate driver 33 and GIP dummy gate driver 34, and the dummy area D in the display area of the upper substrate 32 is formed with the black matrix layer.

When the signal lines 35 are exposed to an electrostatic discharge during processing, elements of the thin film transistor array may be damaged. Thus, in order to prevent this phenomenon, electrostatic discharge prevention circuits are provided to the signal lines 35, and the signal lines 35 are connected to a first TCP 37.

A liquid crystal layer is formed between the upper and lower substrates 31 and 32 in the display area.

In such a GIP type liquid crystal display panel constructed as above, it is necessary to form the MPS wires as described in FIG. 2.

However, compared with a typical liquid crystal display device (see FIG. 2), the GIP type liquid crystal display device further comprises not only the GIP gate driver 33 and GIP dummy gate driver 34 but also the signal lines 35 to apply the signals thereto formed in the dummy area as described above. Furthermore, compared with the typical liquid crystal display device having 5 to 6 MPS wires, the GIP type liquid crystal display device requires more MPS wires (about 10 to 15 MPS wires) since it is necessary to check for opens or shorts of the signal lines.

Thus, the GIP type liquid crystal display device has shortcomings in that it is difficult to obtain sufficient space to form the MPS wires and to check for defects in the respective lines.

In addition, since the MPS wires are preferably concentrated on the first TCP region for the GIP type liquid crystal display device to check for defective signal lines, it is further difficult to secure the space for the MPS wires.

SUMMARY

Accordingly, the present disclosure is directed to a substrate for a GIP type liquid crystal display device and method for manufacturing the same that may substantially obviate one or more problems due to limitations and disadvantages of the related art.

Described herein is a substrate for a GIP type liquid crystal display device, comprising a mother substrate having a plurality of panel regions defined therein. Each of the panel regions includes an active area having a thin film transistor array formed therein, a dummy area and a non-display area. A plurality of TCPs are disposed in the non-display area. A GIP gate driver and signal lines to apply various signals to the GIP gate drivers, the GIP gate driver and signal lines are disposed in the dummy area, and a plurality of MPS wires extend from the non-display area of a first panel region to a non-display area opposite to a data pad of an adjacent panel region to inspect for defects of gate lines, data lines, a common line, a voltage line and the signal lines.

In another aspect, a method for manufacturing a substrate for a GIP liquid crystal display device is provided. The method comprises preparing a first mother substrate having a plurality of panel regions defined therein, each of the panel regions having an active area, a dummy area and a non-display area. Gate lines and gate electrodes for a thin film transistor array are formed in the active area, signal lines for a GIP gate driver are formed in the dummy area, and a plurality of MPS wires are formed in the non-display area of a first panel region and in a non-display area opposite to a data pad of a panel region adjacent to the first panel region. A gate insulating layer is formed over an upper surface of the mother substrate including the gate lines, the signal lines and the MPS wires. An active layer is formed on the gate insulating layer above the gate electrode, and data lines of the thin film transistor array are formed on the gate insulating layer in the active area so as to allow source/drain electrodes to be positioned at both sides of the active layer. A protective layer is formed over the upper surface of the mother substrate including the data lines, and a pixel electrode is formed in each pixel region on the protective layer to be connected with the drain electrode.

It is to be understood that both the foregoing general description and the following detailed description are exemplary and explanatory and are intended to provide further explanation of the invention as claimed.

DETAILED DESCRIPTION

Reference will now be made in detail to various preferred embodiments, examples of which are illustrated in the accompanying drawings. Wherever possible, the same reference numbers will be used throughout the drawings to refer to the same or like parts.

Figure 4:
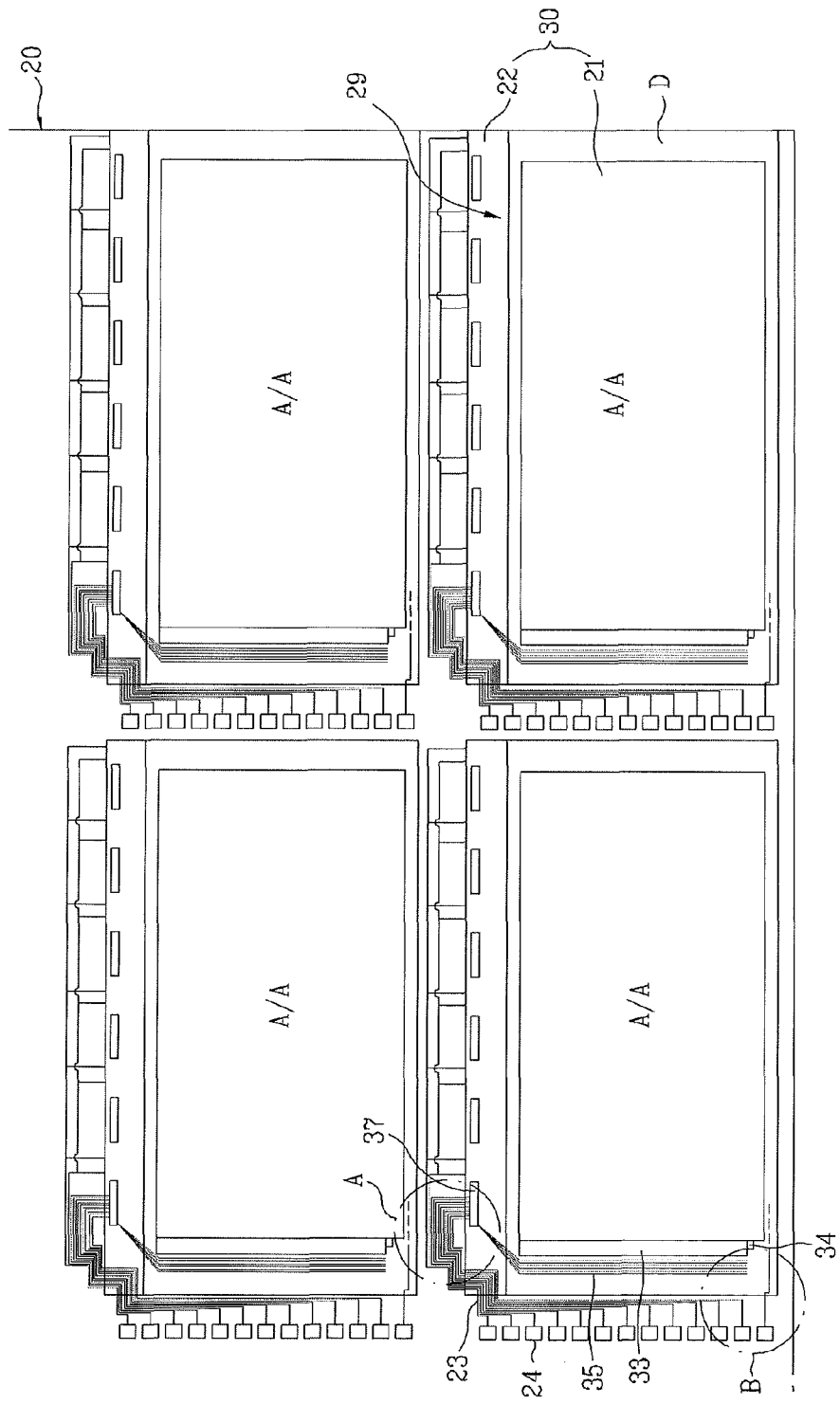
FIG. 4 is a wiring plan view showing arrangement of MPS wires of a GIP liquid crystal display device according to one embodiment.
Figure 5:
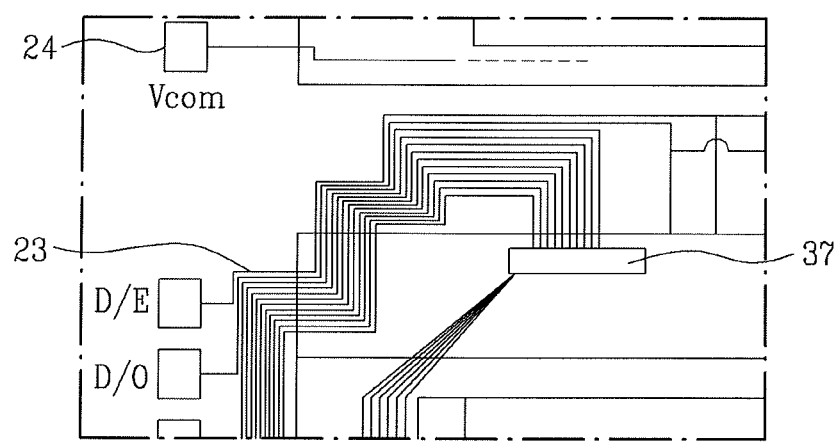
FIG. 5 is a partially exploded view of Part A of FIG. 4.
Figure 6:
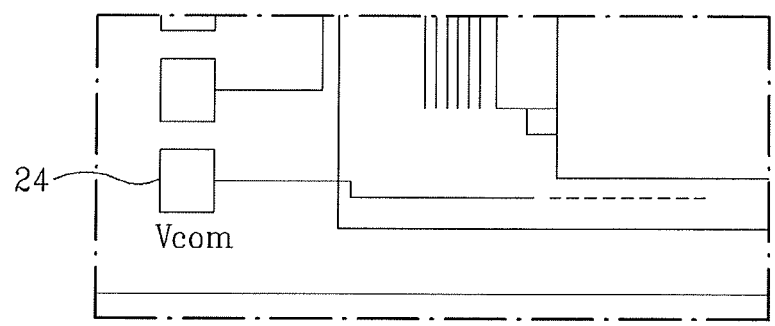
FIG. 6 is a partially exploded view of Part B of FIG. 4.

FIG. 4 is a wiring plan view showing an arrangement of MPS wires of a GIP liquid crystal display device according to one embodiment; FIG. 5 is a partially exploded view of part A of FIG. 4; and FIG. 6 is a partially exploded view of part B of FIG. 4.

Specifically, FIG. 4 shows a lower mother substrate having a plurality of panel regions 30 defined therein. Wherein the plurality of penal regions 30 are arranged at fixed inveral, and each of the panel regions 30 has a display area 21 and a non-display area 22 where a data driver and the like are mounted. The display area 21 is divided into an active area A/A and a dummy area D.

Figure 3:
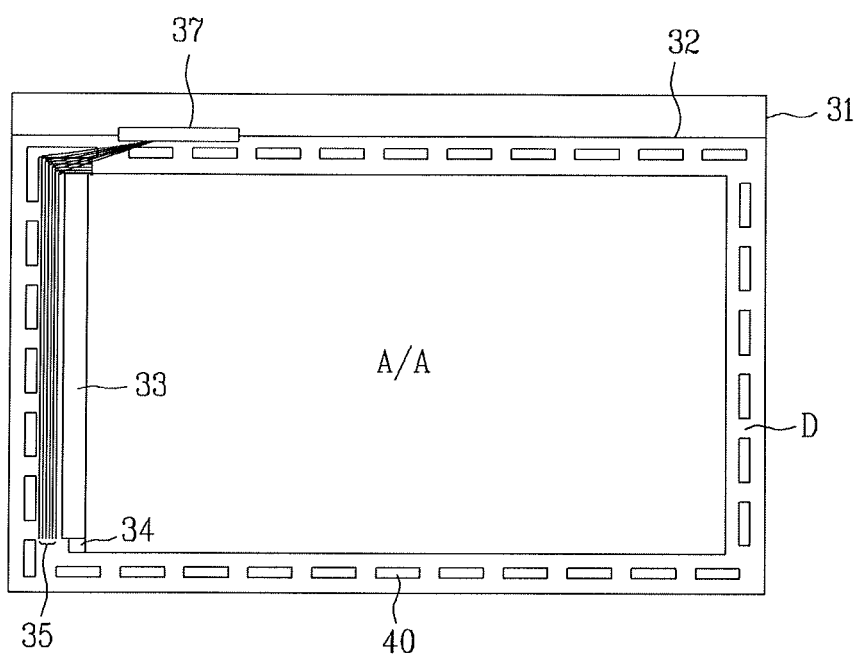
FIG. 3 is a plan view of a conventional GIP type liquid crystal display device.

A sealant (not shown in FIG. 4, see 40 of FIG. 3) is provided in the dummy area surrounding the active area A/A to bond together lower and upper mother substrates. A plurality of tape carrier packages (TCPs) 37 for the data driver are mounted on the non-display area 22 of the lower substrate.

Figure 1:
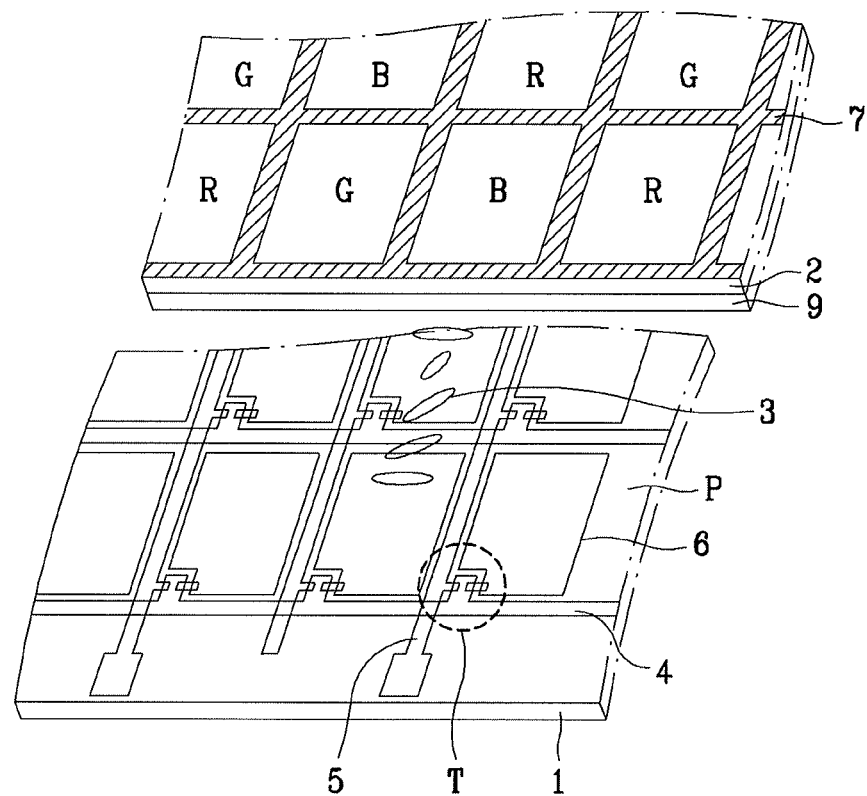
FIG. 1 is a partially exploded perspective view of a conventional liquid crystal display device.
Figure 2:
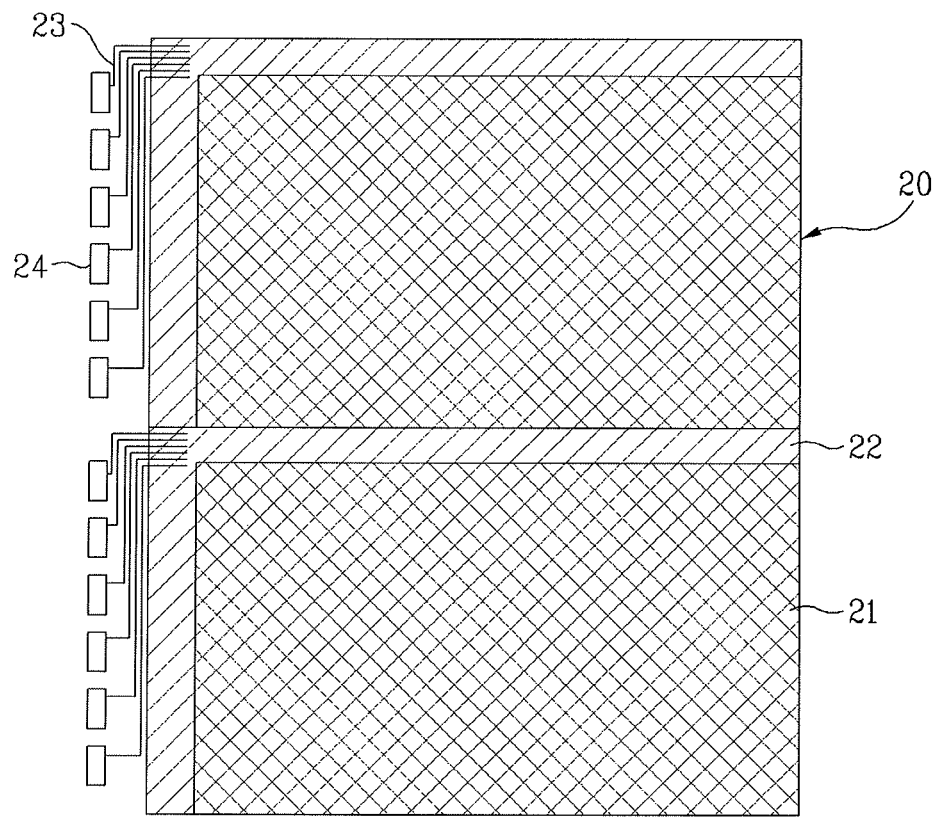
FIG. 2 is a plan view showing MPS wires of the conventional liquid crystal display device.

The active area (A/A) in the display area of the lower mother substrate 20 is formed with a thin film transistor array having gate lines, data lines, pixel electrodes and thin film transistors. The active area (A/A) in the display area of the upper mother substrate (not shown) is formed with a color filter array having a black matrix layer, color filter layers and a common electrode (see FIG. 1).

The dummy area (D) in the lower mother substrate 20 is formed with a common line (not shown in the drawings), a GIP gate driver 33, a GIP dummy gate driver 34, and signal lines 35 to apply various signals (clock signal, enable signal, start signal, common voltage, etc.) output from the timing controller to the GIP gate driver 33 and GIP dummy gate driver 34, and the dummy area D in the upper mother substrate is formed with a black matrix layer.

The signal lines 35 are connected to a first TCP 37. Also, although not shown in the drawings, electrostatic discharge prevention circuits are provided to the signal lines 35 (see FIG. 3).

In addition, the non-display area of each panel region of the lower mother substrate 20 is formed with MPS wires 23 and MPS pads 24.

The MPS wires 23 typically comprise about 5 to 6 wires such as a wire "G/E" for inspecting gate lines of even order, a wire "G/O" for inspecting gate lines of odd order, a wire "D/E" for inspecting data lines of even order, a wire "D/O" for inspecting data lines of odd order, a wire "Vcom" for inspecting a common line, a wire "GND" for inspecting a ground line, a wire "VDD" for inspecting a voltage line, etc. The MPS wires 23 further comprise test wires to test for defects in the signal lines 35 which serve to apply the various signals to the GIP gate driver 33 and GIP dummy gate driver 34.

The MPS wires 23 and MPS pads 24 are formed simultaneously when forming the gate lines of the thin film transistor array. The MPS wires 23 except wires D/E", "D/O" and "Vcom" are connected to input pads of the first TCP 37.

The number of MPS wires 23, including the test MPS wire for the signal lines 35, is from about 10 to about 15. As such, since the number of MPS wires 23 is from about 10 to about 15, and the MPS wires 23 except wires for the even data lines D/E, the odd data lines D/O and the common line Vcom are connected to the first TCP 37, it is difficult to form all of the MPS wires 23 for one panel region in the non-display area of the corresponding panel region.

To solve this problem, the MPS wires 23 for a first panel region may utilize a space opposite to a data pad region 29 of a panel region adjacent to the first panel region. These test MPS wires 23 generally are needed not to drive the liquid crystal display device, but to check for defects of the respective lines after a cell process. The MPS wires 23 may be removed after completing the liquid crystal display panel.

Thus, the MPS wires 23 may be formed in the space of the non-display area opposite to the data pad region 29 of the adjacent panel region during the cell process.

It is desirable to prevent the respective MPS wires 23 from mutually overlapping. Consequently, the MPS wires are disposed in a non-overlapping arrangement. For example, as shown in FIG. 5, the MPS wires 23 for the even data lines D/E and the odd data lines D/O are disposed at an outermost portion of the arrangement and connected to the data lines of even order and the data lines of odd order among the plural data lines.

In addition, as shown in FIG. 6, the MPS wire 23 for the common line (Vcom) may be disposed at an opposite side to the MPS wires 23 for the even data and odd data lines. In other words, the MPS wire 23 for the common line (Vcom) may be disposed at an innermost portion of the arrangement. With this arrangement, the MPS wires 23 are prevented from mutually overlapping.

There will be described hereinafter a method for forming MPS wires of a GIP type liquid crystal display device according to the present disclosure with reference to the accompanying drawings.

FIGS. 7A to 7F are cross-sectional views of steps of the method for manufacturing the GIP liquid crystal display device.

Figure 7A:
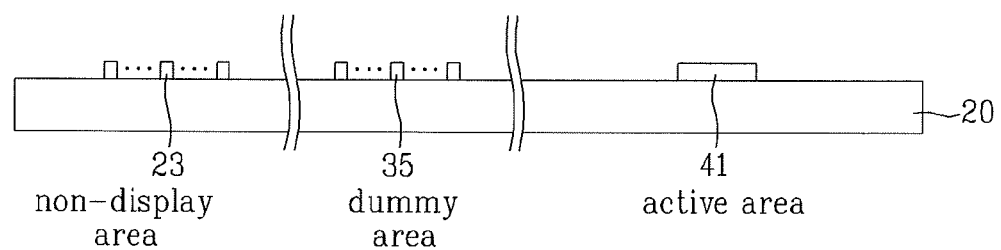
FIGS. 7A to 7F are cross-sectional views of steps of a method for manufacturing a GIP liquid crystal display device.

Referring to FIG. 7A, a low resistance metal layer is first deposited on a lower mother substrate 20 having a plurality of panel regions 30 defined thereon, in which each panel region has an active area, a dummy area and a non-display area defined therein. Then, the metal layer is selectively removed by a photolithography process to form a gate electrode 41 of a thin film transistor on the active area. At the same time, signal lines 35 for a GIP gate driver and a GIP dummy gate driver are formed in the dummy area, and MPS wires 23 and MPS wire pads 24 are formed in the non-display area.

Although not shown in the drawings, a gate electrode of each transistor of the GIP gate driver 33 and the GIP dummy gate driver 34 is simultaneously formed when forming the gate electrode 41.

In addition, the MPS wires 23 are formed by use of a space opposite to a data pad of an adjacent panel region as described in FIG. 4.

Figure 7B:
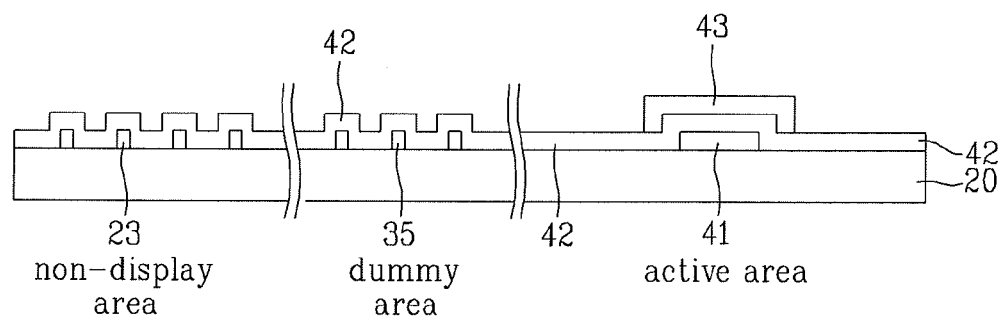

Referring to FIG. 7B, a gate insulating layer 42 is formed over an upper surface of the lower mother substrate 20 including the gate electrode 41, signal lines 35 and the MPS wires 23 and the MPS pads 24.

Then, a semiconductor layer is formed on the gate insulting layer 42, and selectively removed to form an active layer 43 of the thin film transistor above the gate electrode in the active area. Although not shown in the drawings, an active layer of each transistor of the GIP gate driver and the GIP dummy gate driver is simultaneously formed therewith.

Figure 7C:
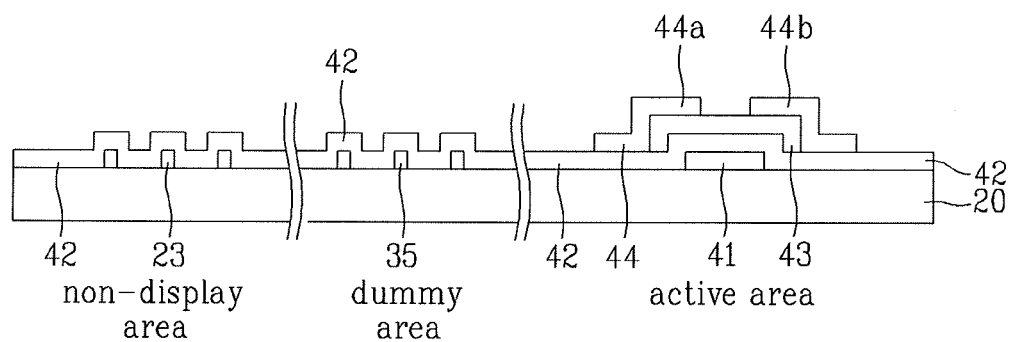

Referring to FIG. 7C, a low resistance metal layer is deposited on the upper surface of the substrate 20 including the active layer, and selectively removed to form source/drain electrodes 44*a* and 44*b*, and data lines 44 in the active area. Although not shown in the drawings, source/drain electrodes of each transistor of the GIP gate driver 33 and the GIP dummy gate driver 34 are simultaneously formed therewith.

Figure 7D:
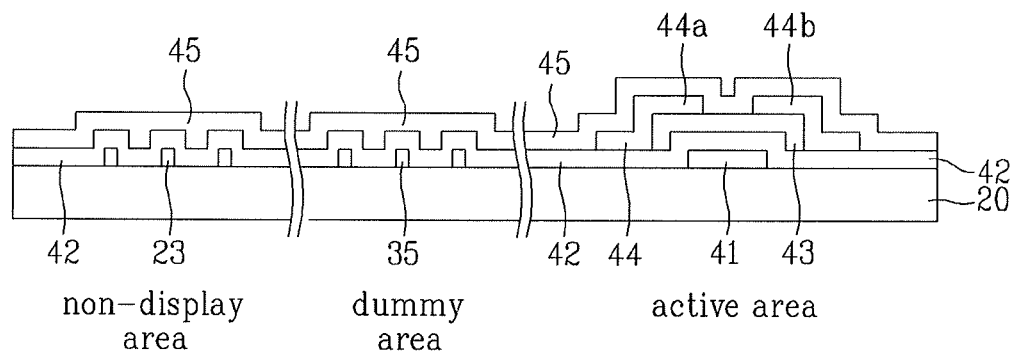

Referring to FIG. 7D, a protective layer 45 is formed over the upper surface of the lower mother substrate 20 including the data lines 44.

Figure 7E:
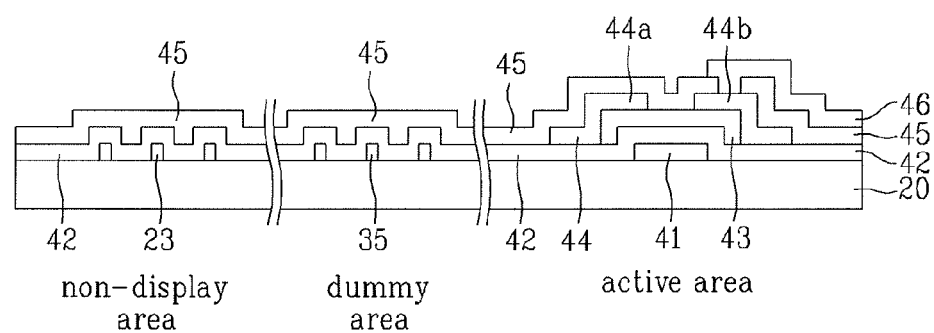

Referring to FIG. 7E, a contact hole is formed on the drain electrode 44*b* by selectively removing the protective layer 45 on the drain electrode 44*b*.

Then, by depositing and selectively removing a transparent conductive layer, such as indium-tin oxide (ITO) or indium-zinc oxide (IZO), over the upper surface of the mother substrate, a pixel electrode is formed in each pixel region such that the pixel electrode is connected to the drain electrode 44*b* through the contact hole.

After completing the lower substrate, the MPS wires 23 and the pads 24 are used to check for defects in the respective lines and a repair process is performed on any defective lines.

Figure 7F:
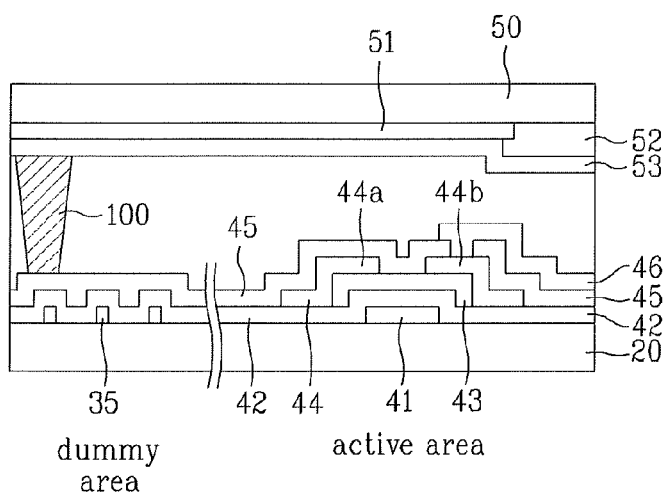

Referring to FIG. 7F, after preparing an upper mother substrate 50 having a black matrix layer 51, a color filter layer 52, a common electrode 53, etc., a sealant 100 is applied to an edge of the dummy area of each panel region of the lower or upper mother substrate 20 or 50. Then, the upper and lower mother substrates 20 are 50 are bonded, and the sealant is then irradiated with light to cure the sealant.

Then, the bonded upper and lower mother substrates are cut into unit panels. At this time, the MPS 23 wires and pads 24 formed in the non-display area are removed.

As is apparent from the above description, the GIP type liquid crystal display device and method for manufacturing the same according to the present disclosure may provide various advantages.

Since the MPS wires may be designed by use of the space opposite to a data pad of an adjacent panel region, it is possible for the GIP type liquid crystal display device to check for defects of the respective signal lines by use of the MPS wires, and to perform a repairing process if there are any defects in the signal lines.

It will be apparent to those skilled in the art that various modifications and variations can be made in the present disclosure without departing from the spirit or scope of the inventions. Thus, it is intended that the present invention covers the modifications and variations of this disclosure provided they come within the scope of the appended claims and their equivalents.

What is claimed is:

1. A mother substrate for a GIP type liquid crystal display (LCD) device, wherein the mother substrate comprises:
    an array of at least first and second GIP type LCD device panel regions, wherein the second GIP type LCD device panel region is adjacent to the first GIP type LCD device panel region along a data pad of the first GIP type LCD device panel region, wherein each of the first and the second GIP type LCD device panel regions includes:
        at least an active area having a thin film transistor array formed therein, a dummy area and a non-display area, wherein the dummy area includes a data pad, a GIP gate driver and a plurality of signal lines, wherein the data pad is orthogonally disposed to both the GIP gate driver and the plurality of signal lines;
        a plurality of Tape Carrier Packages (TCPs) disposed along a first non-display area of the first GIP type LCD device panel region, wherein the first non-display area is on a same side of the data pad; and
        a plurality of MPS wires extending from the first of the plurality of TCPs, wherein the plurality of MPS wires extend from the first of the plurality of TCPs into a second non-display area of the second GIP type LCD device panel region, wherein the second non-display area of the second GIP type LCD device panel region is directly adjacent to the first non-display area of the first GIP type LCD device panel region to enable inspection for defects of gate lines, data lines, a common line, a voltage line of the thin film transistor array and the plurality of signal lines of the first panel region.

2. The mother substrate according to claim 1, wherein the MPS wires are disposed in a non-overlapping arrangement.

3. The mother substrate according to claim 2, wherein an MPS wire for inspection of the data lines among the MPS wires is disposed at an outermost portion of the arrangement.

4. The mother substrate according to claim 1, wherein the array comprises a horizontal or vertical step and repeat pattern of a plurality arrays of the first and the second GIP type LCD device panel regions.

5. The mother substrate according to claim 2, wherein an MPS wire for inspection of the common line among the MPS wires is disposed at an innermost portion of the arrangement.

6. The mother substrate according to claim 1, wherein the MPS wires and the plurality of signal lines are formed of a same material as the gate lines of the thin film transistor array.

7. A method for manufacturing a mother substrate for a GIP type liquid crystal display (LCD) device, comprising:
    preparing a GIP type LCD device mother substrate having an array of at least first and second GIP type LCD device panel regions, wherein the second GIP type LCD device panel region is adjacent to the first GIP type LCD device panel region along a data pad of the first GIP type LCD device panel region, wherein each of the first and the second GIP type LCD device panel regions includes:
        at least an active area having a thin film transistor array formed therein, a dummy area and a non-display area, wherein the dummy area includes a data pad, a GIP gate driver and a plurality of signal lines, wherein the data pad is orthogonally disposed to both the GIP gate driver and the plurality of signal lines;
    forming gate lines and gate electrodes for a thin film transistor array in the active area;
    forming a plurality of Tape Carrier Packages (TCPs) disposed along a first non-display area of the first GIP type LCD device panel region, wherein the first non-display area is on a same side of the data pad;

forming the GIP gate driver and the plurality of signal lines in a dummy area of the first GIP type LCD device panel region, wherein various signals are applied to the GIP gate driver and the signal lines; and forming a plurality of MPS wires extending from the first of the plurality of TCPs, wherein the plurality of MPS wires extend from the first of the plurality of TCPs into a second non-display area of the second GIP type LCD device panel region, wherein the second non-display area of the second GIP type LCD device panel region is directly adjacent the first non-display area of the first GIP type LCD device panel region to enable inspection for defects of gate lines, data lines, a common line, a voltage line of the thin film transistor array and the plurality of signal lines of the first panel region;

forming a gate insulating layer over an upper surface of the first mother substrate including the gate lines, the plurality of signal lines and the MPS wires;

forming an active layer on the gate insulating layer above the gate electrode;

forming data lines of the thin film transistor array on the gate insulating layer in the active area so as to allow source/drain electrodes to be positioned at both sides of the active layer;

forming a protective layer over the upper surface of the GIP type LCD device mother substrate including the data lines; and forming a pixel electrode in each pixel region on the protective layer to be connected with the drain electrode.

8. The method according to claim 7, wherein the forming of the gate lines, gate electrodes, the plurality of signal lines and MPS lines occurs simultaneously.

9. The method according to claim 7, further comprising:

checking for defective plurality of signal lines and lines of the thin film transistor array using the MPS wires;

repairing defective plurality of signal lines and lines of the thin film transistor array;

disposing a second GIP type LCD device mother substrate in opposition to the first GIP type LCD device mother substrate;

providing a sealant in the dummy area of each panel region of the first GIP type LCD device mother substrate or in a dummy area of each panel region of the second mother substrate;

bonding together the first and second GIP type LCD device mother substrates by use of the sealant; and cutting the bonded first and second GIP type LCD device mother substrates into unit panels to remove the MPS wires formed in the non-display area.

10. The method according to claim 7, wherein the array comprises a horizontal or vertical step and repeat pattern of a plurality arrays of the first and the second GIP type LCD device panel regions.

* * * * *